(12) United States Patent  
Lee et al.

(10) Patent No.: US 8,766,755 B2  
(45) Date of Patent: Jul. 1, 2014

(54) TRANSFORMER AND LIQUID CRYSTAL DISPLAY APPARATUS HAVING THE SAME

(75) Inventors: Yun-Gun Lee, Asan-si (KR); Moon-Shik Kang, Yongin-si (KR); Timothy Su, Tucson, AZ (US); Ju-Hyun Lee, Cheongwon-gun (KR)

(73) Assignee: Samsung Display Co., Ltd., Yongin (KR)

( * ) Notice: Subject to any disclaimer, the term of this patent is extended or adjusted under 35 U.S.C. 154(b) by 832 days.

(21) Appl. No.: 13/011,111

(22) Filed: Jan. 21, 2011

(65) Prior Publication Data

US 2011/0204812 A1      Aug. 25, 2011

(30) Foreign Application Priority Data

Feb. 23, 2010    (KR) .......................... 10-2010-0016232

(51) Int. Cl.
  *H01F 27/08*   (2006.01)
  *H01F 21/08*   (2006.01)
  *H01F 27/24*   (2006.01)

(52) U.S. Cl.
  USPC .............................. 336/60; 336/155; 336/219

(58) Field of Classification Search
  None
  See application file for complete search history.

(56) References Cited

U.S. PATENT DOCUMENTS 7,446,641 B2 * 11/2008 Fushimi ........................ 336/212
8,284,009 B2 * 10/2012 Akiyama et al. .............. 336/198

FOREIGN PATENT DOCUMENTS

KR    10-2006-0031095         6/2007

* cited by examiner

*Primary Examiner* — Douglas W Owens
*Assistant Examiner* — Dedei K Hammond
(74) *Attorney, Agent, or Firm* — H.C. Park & Associates, PLC

(57) ABSTRACT

A transformer and a liquid crystal display apparatus having the transformer are provided. The transformer includes a bobbin having at least one first winding section, at least one second winding section, and at least one core insertion groove formed therein. The transformer also includes at least one coil wound around the first winding section and the second winding section with at least one core inserted into the core insertion groove.

15 Claims, 10 Drawing Sheets ic quality of a liquid crystal display that includes the transformer by reducing electrical noise due to collision of magnetic fluxes created in the transformer.

Additional features of the invention will be set forth in the description which follows and, in part. will be apparent from the description or may be learned by practice of the invention.

An exemplary embodiment of the present invention discloses a transformer that comprises a bobbin. The bobbin comprises at least one first winding section, at least one second winding section, and at least one core insertion groove. The transformer also comprises at least one coil disposed around each of the first winding section and the second winding section, and at least one core disposed in the core insertion groove.

An exemplary embodiment of the present invention also discloses a transformer that comprises a bobbin. The bobbin comprises a first transforming section and a second transforming section, each of the first transforming section and the second transforming section comprising a plurality of winding sections, and at least one core insertion groove disposed between the first transforming section and the second transforming section. The transformer also comprises at least one coil disposed around at least one of the plurality of winding sections of each of the first transforming section and the second transforming section; and at least one core arranged in the at least one core insertion groove An exemplary embodiment of the present invention further discloses a liquid crystal display (LCD) apparatus that comprises an LCD panel; one or more light sources for supplying light to the LCD panel; and a light source controller to control the one or more light sources, wherein the light source controller comprises at least one transformer, and the at least one transformer comprises a bobbin comprising at least one first winding section, at least one second winding section, and at least one core insertion groove; at least one coil disposed around each of the first winding section and the second winding section; and at least one core disposed in the core insertion groove An exemplary embodiment of the present invention additionally discloses an LCD apparatus that comprises an LCD panel; one or more light sources for supplying light to the LCD panel; and a light source controller to control the one or more light sources, wherein the light source controller comprises at least one transformer. The at least one transformer comprises a bobbin comprising a first transforming section, a second transforming section, and at least one core insertion groove disposed between the first transforming section and the second transforming section, each of the first transforming section and the second transforming section comprising a plurality of winding sections; at least one coil disposed around each of the winding sections of the first transforming section and the second transforming section; and at least one core disposed in the core insertion groove.

It is to be understood that both the foregoing general description and the following detailed description are exemplary and explanatory and are intended to provide further explanation of the invention as claimed.

TRANSFORMER AND LIQUID CRYSTAL DISPLAY APPARATUS HAVING THE SAME

CROSS REFERENCE TO RELATED APPLICATION

This application claims priority from and the benefit of Korean Patent Application No. 10-2010-0016232, filed on Feb. 23, 2010, which is hereby incorporated by reference for all purposes as if fully set forth herein.

BACKGROUND OF THE INVENTION

1. Field of the Invention

Exemplary embodiments of the present invention relate to a transformer and a liquid crystal display apparatus having the transformer.

2. Discussion of the Background

Along with recent trends of display devices becoming lighter, thinner, shorter, and smaller, flat panel display devices such as liquid crystal displays (LCDs) are becoming major players in the display industry. The LCD typically includes a liquid crystal display panel, a first substrate, a second substrate facing and opposite to the first substrate, and a liquid crystal layer between the first substrate and the second substrate. A light source for providing the liquid crystal display panel with light is generally included since the liquid crystal display panel is a non-emissive device. For example, a cold cathode fluorescent lamp (CCFL), a light emitting diode (LED), or the like may be used as the light source. In this case, the LCD may be provided with a light source controller for driving the light source of the LCD. When using a CCFL, which requires a relatively high voltage, as a backlight of the LCD, the light source controller is provided with a step-up power supply device such as a transformer for outputting relatively high voltage in comparison to power delivered to the other components of the LCD.

A transformer generally has a primary section and a secondary section formed by windings. A 1-in-1 type transformer having a single secondary output is a basic type of transformer. Presently, transformers having two or more outputs, for example, 2-in-1 type products, or 4-in-1 type products, are being commercialized. The transformer may be used to amplify a power level or to adjust current balancing between wirings.

SUMMARY OF THE INVENTION

Exemplary embodiments of the present invention provide a transformer that increases a balance level of current applied to a light source and minimizes factors causing defects such as electrical noise by reducing collisions between magnetic fluxes.

Exemplary embodiments of the present invention also provide a transformer with improved operating characteristics that minimize defect-causing factors, e.g., electrical noise, by reducing collisions between magnetic fluxes formed by windings during the operation of the transformer.

Exemplary embodiments of present invention further provide a transformer that may be used as a current balancing transformer for equalizing currents applied to light sources whereby the transformer may function to increase the equilibrium level of the outputs applied to the light sources, thereby increasing uniformity of brightness of each of the light sources.

Exemplary embodiments of present invention additionally provide a transformer that may produce uniformity in the

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE ILLUSTRATED EMBODIMENTS

Figure 1:
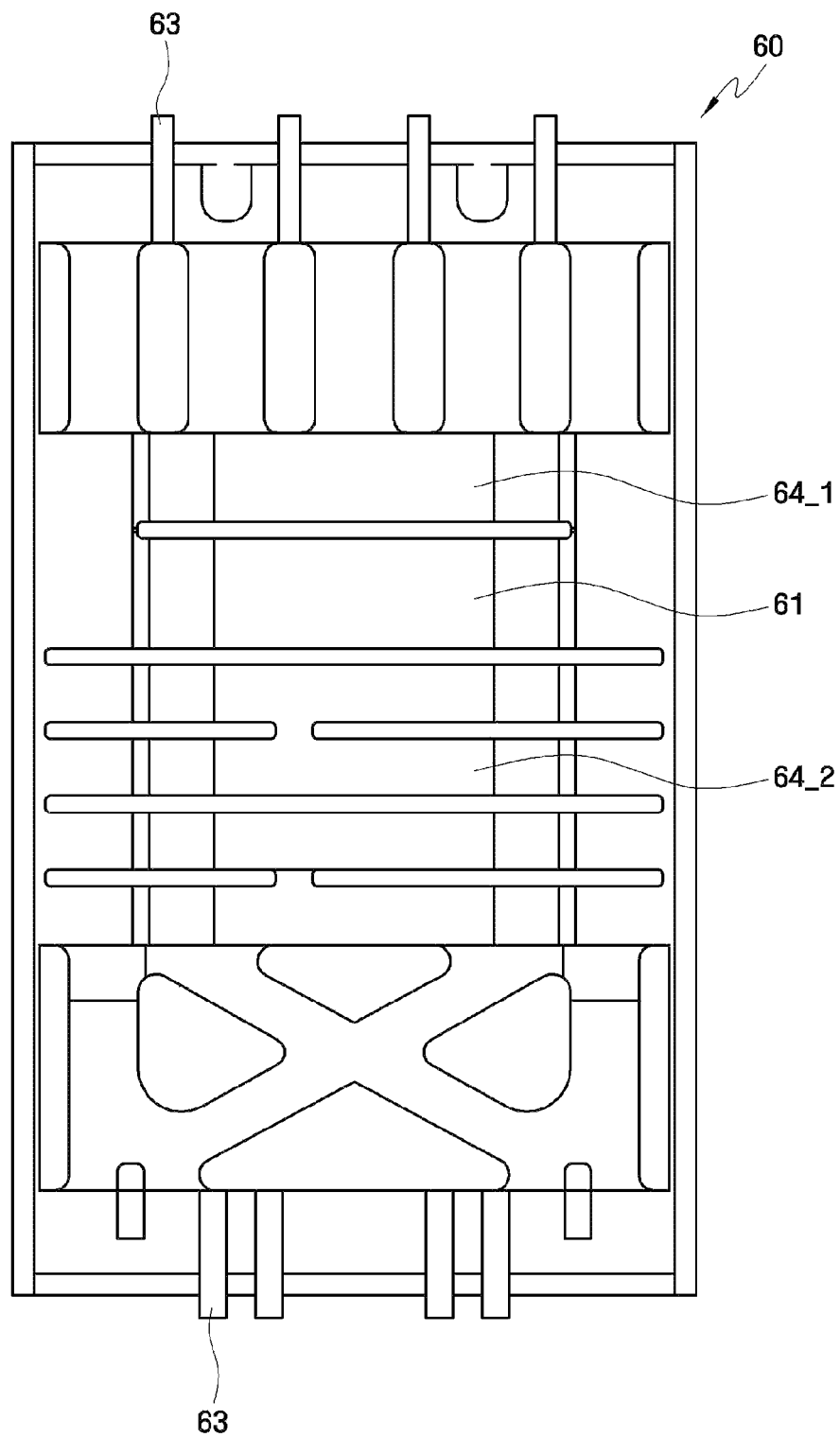
FIG. 1 is a rear view of a general transformer.

The invention is described more fully hereinafter with reference to the accompanying drawings in which embodiments of the invention are shown. This invention may, however, be embodied in many different forms and should not be construed as limited to the embodiments set forth herein. Rather, these embodiments are provided so that this disclosure is thorough and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on," "connected to," or "coupled to" another element or layer, it can be directly on, directly connected to, directly coupled to the other element or layer, or intervening elements or layers may be present. In contrast, when an element is referred to as being "directly on," "directly connected to," or "directly coupled to" another element or layer, there are no intervening elements or layers present.

Figure 2:
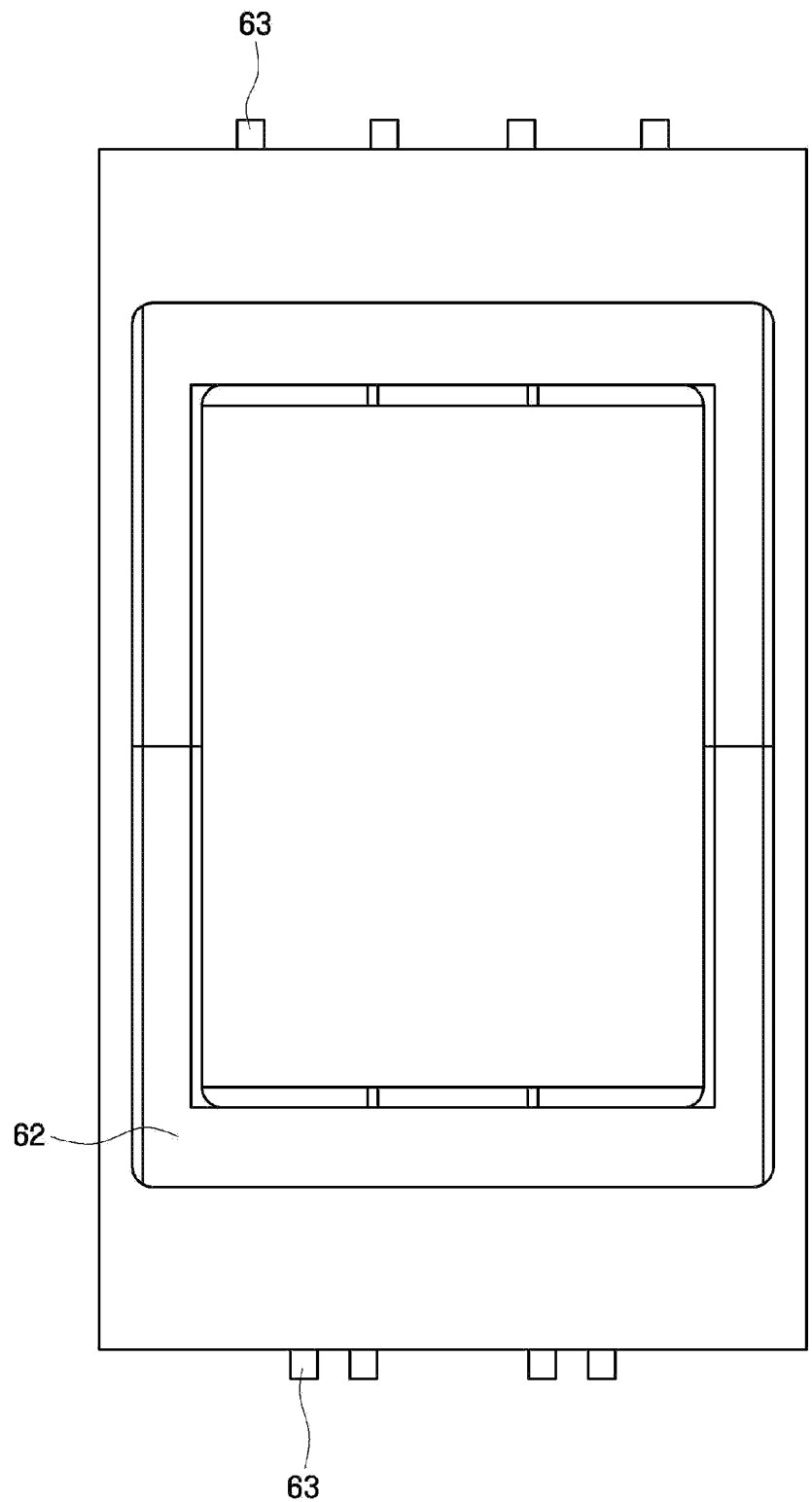
FIG. 2 is a front view of the general transformer shown in FIG. 1.

FIG. 1 is a rear view of a general transformer, and FIG. 2 is a front view of the general transformer.

Referring to FIG. 1 and FIG. 2, the transformer 60 may generally include a bobbin 61, a core 62, a coil (not shown), and an input/output pin 63 connected to the coil.

The input/output pin 63 is used as an electrical input/output path of the transformer 60. The core 62 surrounds the exterior of the bobbin 61. The bobbin 61 may have a hollow portion defined therein, e.g., a bore through the central portion of the bobbin 61, and part of the core 62 may be installed inside the hollow portion. The core 62 may be formed of a ferrite or permalloy based magnetic material. Example shapes of the core 62 may include an I-shaped core, a U-shaped core, an E-shaped core, and the like, but embodiments of the invention are not limited thereto.

The coil may wind around the bobbin 61 one or more turns. The bobbin 61 may include at least one first winding section 64_1 and at least one second winding section 64_2 around which the coil may be wound. The first winding section 64_1 may be a primary winding section, and the second winding section 64_2 may be a secondary winding section. In this case, output values of the voltage and the current of the transformer 60 may be directly or inversely proportional to a ratio of the number of coil turns of the primary winding section 64_1 to the number of coil turns of the secondary winding section 64_2. In addition, current flow through the windings generates magnetic fluxes when power is applied to the transformer 60.

The transformer 60 shown in FIG. 1 includes a single first winding section 64_1 and a single second winding section 64_2. However, the transformer 60 may include a plurality of both the first winding section 64_1 and the second winding section 64_2. The first winding section 64_1 and the second winding section 64_2 may be covered by a cover.

Figure 3:
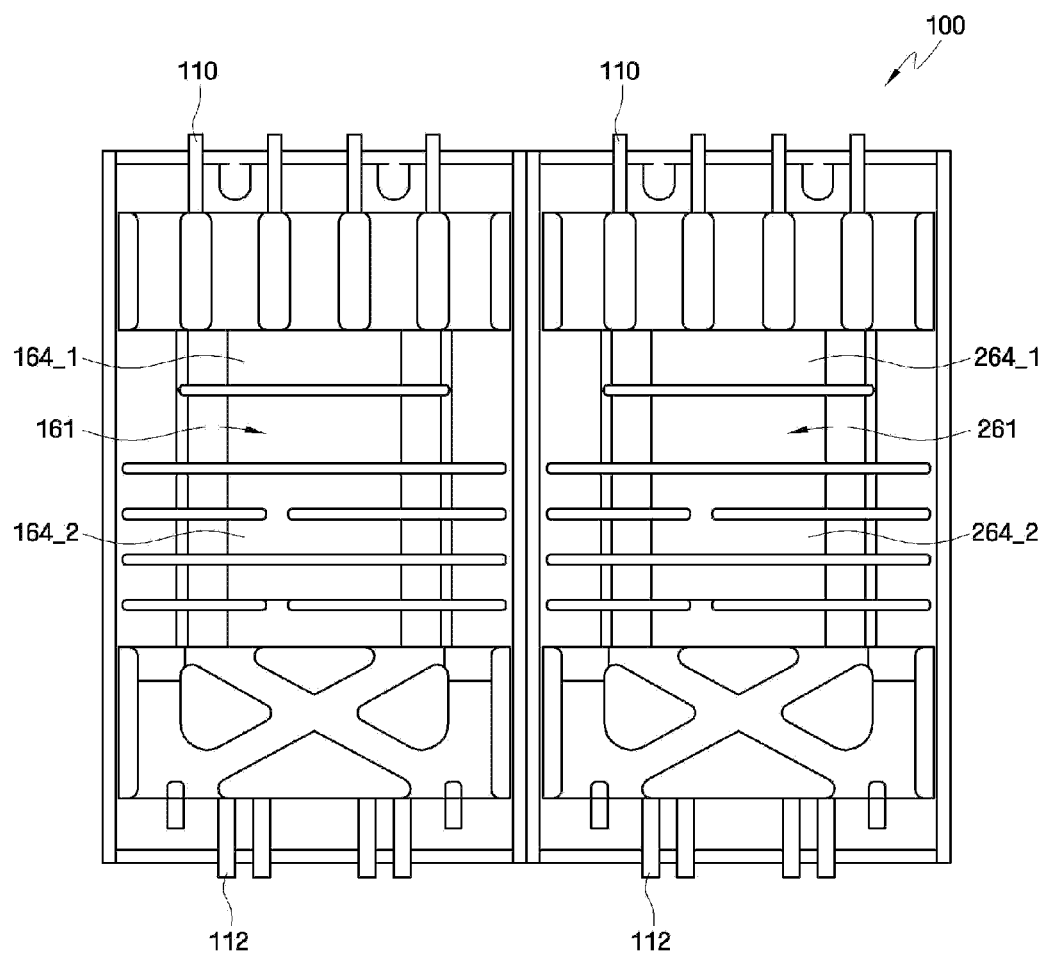
FIG. 3 is a rear view of a general transformer having a plurality of secondary outputs.

FIG. 3 is a rear view of a transformer having a plurality of secondary outputs. As described above, the transformer 60 may include a single first winding section 64_1 and a single second winding section 64_2. As shown in FIG. 3, however, the transformer 100 may include two first winding sections 164_1 and 264_1 and two second winding sections 164_2 and 264_2. Alternatively, the transformer 100 may include a single first winding section and a plurality of second winding sections. Referring to FIG. 3, the transformer 100 may include two or more inputs 110 to be drawn in by coils wound around the first winding sections 164_1 and 264_1 and two or more outputs 112 to be applied by coils wound around the second winding sections 164_2 and 264_2. For example, referring to FIG. 3, two bobbins 161 and 261 are disposed in parallel.

Figure 4:
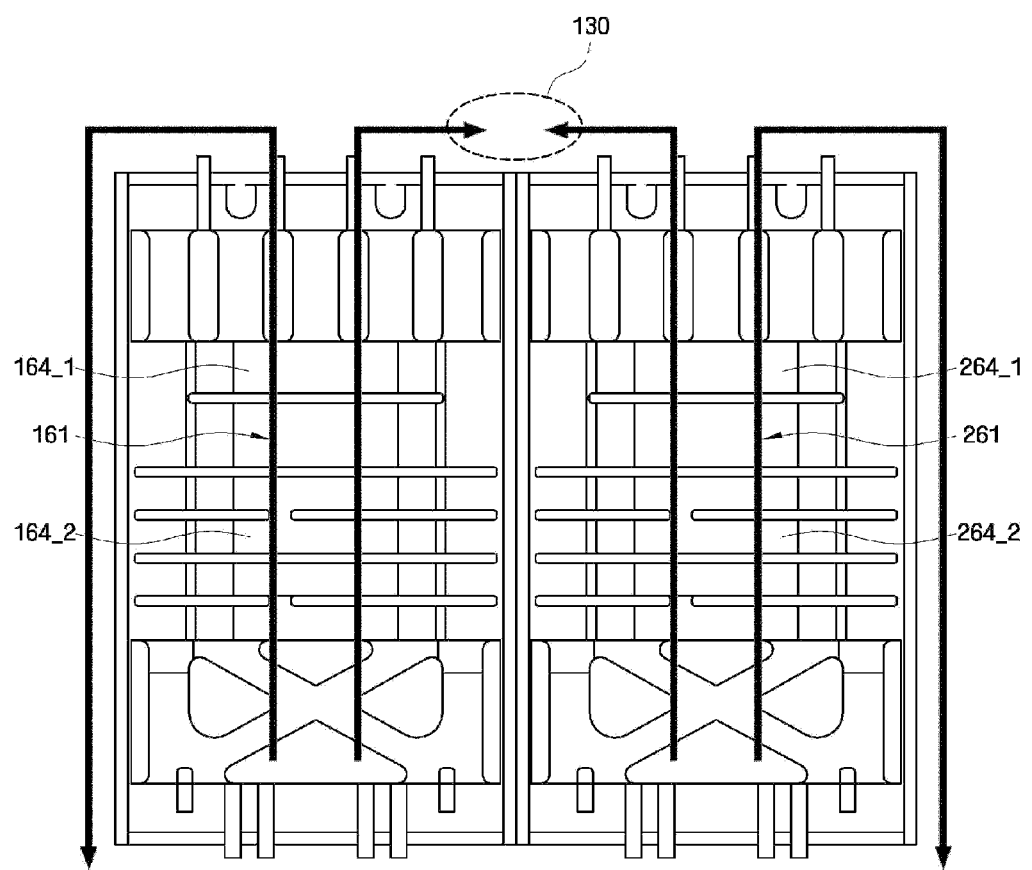
FIG. 4 is a rear view of the transformer of FIG. 3 showing the shape of magnetic flux.

FIG. 4 is a rear view of the transformer of FIG. 3 showing the shape of magnetic flux. Referring to FIG. 4, magnetic flux paths may be established in internal and peripheral areas of the transformer 100 due to first coil windings wound around the first winding sections 164_1 and 264_1 and the second coil windings wound around the second winding sections 164_2 and 264_2 of the transformer 100. Referring to FIG. 4, the first coil windings and the second coil windings are plurally provided and are interconnected left and right to create an area where magnetic fluxes collide, that is, a magnetic flux colliding portion 130. Collision of the magnetic fluxes may cause electrical defects to the transformer 100 designed in an accurate proportion during operation, resulting in increased electrical noise, electromagnetic interference (EMI), and the like. Further, when the transformer 100 is connected to loads and is used as a balance transformer for adjusting the current balance between the loads, balancing using the transformer 100 may not result.

Figure 5:
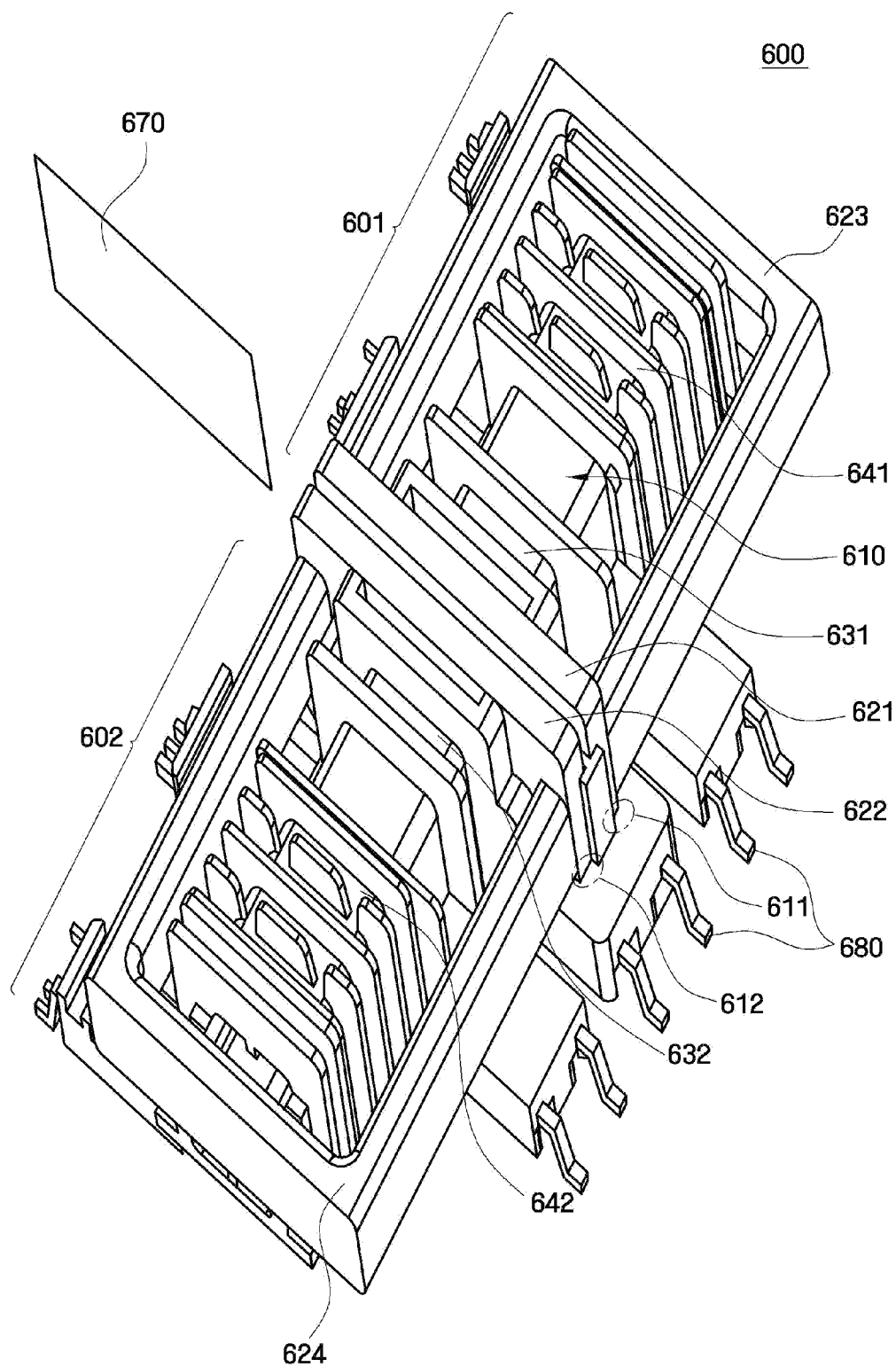
FIG. 5 is a perspective view showing part of a transformer according to an exemplary embodiment of the present invention.
Figure 6:
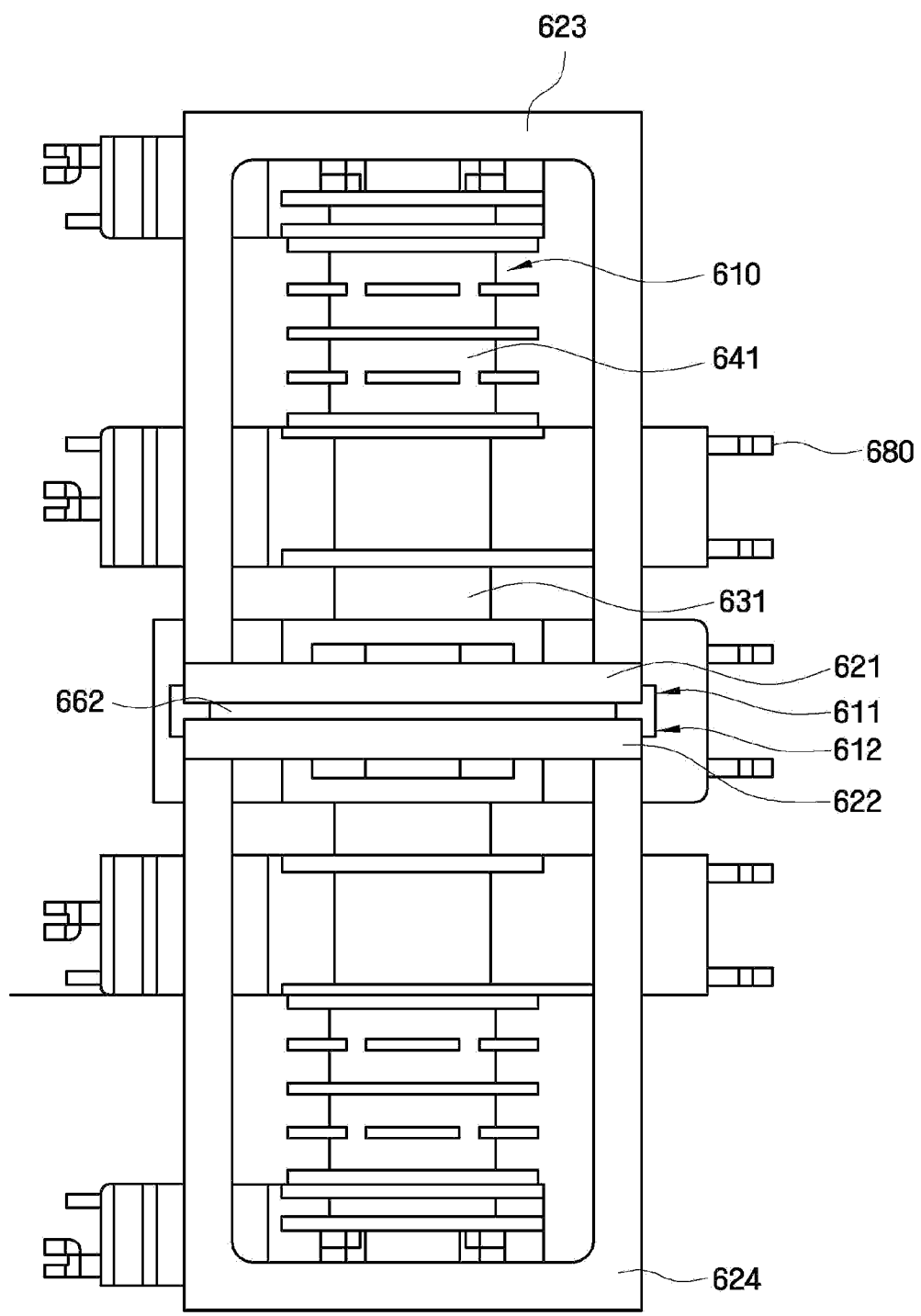
FIG. 6 is a front view of part of the transformer shown in FIG. 5.

FIG. 5 is a perspective view showing part of a transformer according to an exemplary embodiment of the present invention. FIG. 6 is a front view of part of the transformer shown in FIG. 5, and FIG. 7 is a front view of the transformer shown in FIG. 5 with the shape of magnetic flux superimposed.

Figure 7:
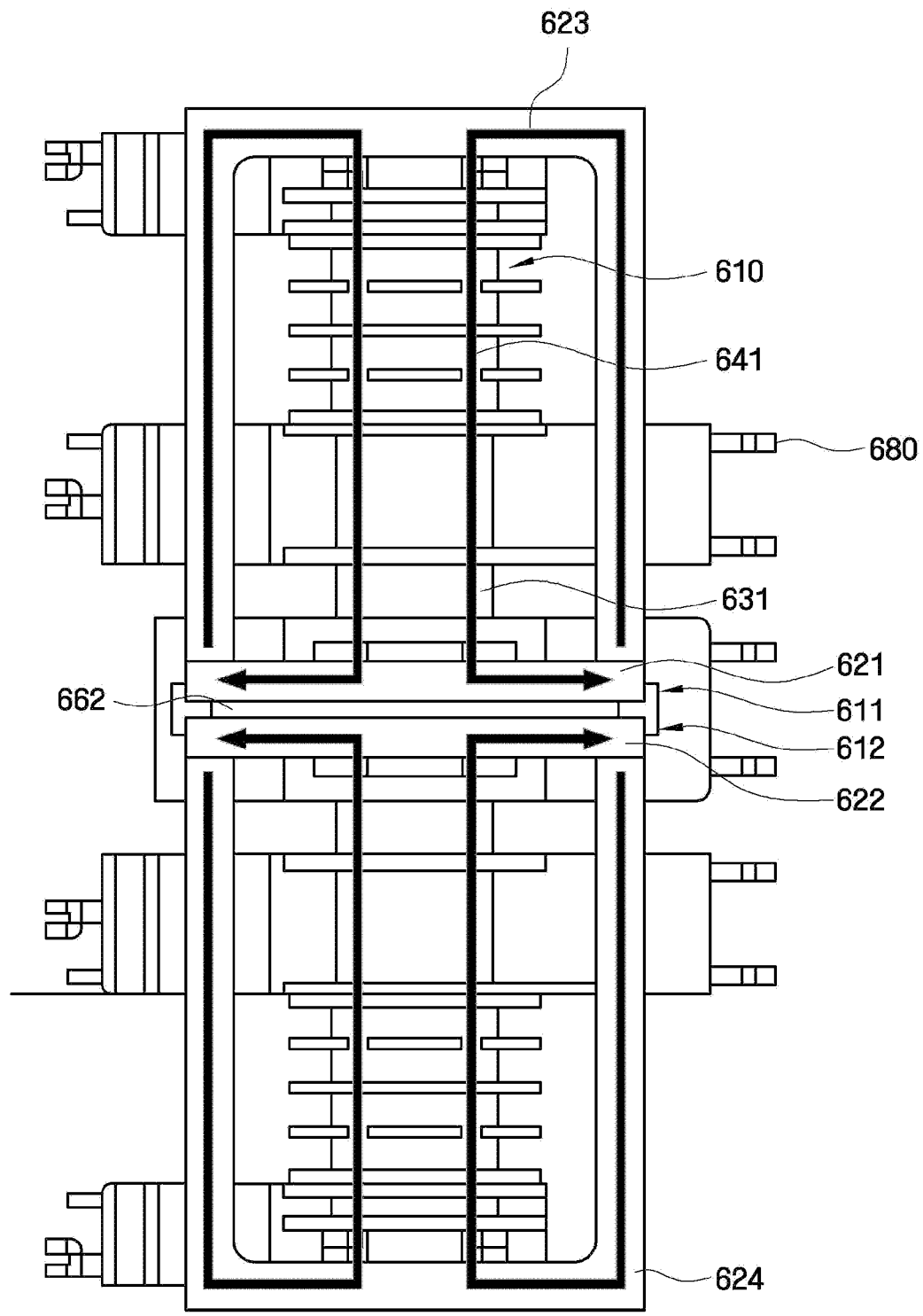
FIG. 7 is a front view of the transformer shown in FIG. 5 with the shape of magnetic flux superimposed.

Referring to FIG. 5, FIG. 6, and FIG. 7, the transformer 600 according to an exemplary embodiment of the present invention includes a bobbin 610, a coil (not shown), and at least one core (not shown).

As shown in FIG. 5, the bobbin 610 includes a first transforming section 601 and a second transforming section 602. The first transforming section 601 and the second transforming section 602 may be disposed substantially collinearly. Unlike the previous exemplary embodiment illustrated in FIG. 3 and FIG. 4, the current exemplary embodiment disposes the first transforming section 601 and the second transforming section 602 in a series configuration.

The first transforming section 601 may include a first winding section 631 and a second winding section 641. The second transforming section 602 may include a first winding section 632 and a second winding section 642.

Coils are wound around the first and the second winding sections 631 and 641 of the first transforming section 601 and the first and the second winding sections 632 and 642 of the second transforming section 602.

The bobbin 610 includes at least one core insertion groove. The coil insertion groove is shaped to receive at least one core. FIG. 5, FIG. 6, and FIG. 7 show that the core insertion groove includes a first core insertion groove 611 and a second core insertion groove 612.

The first core insertion groove 611 and the second core insertion groove 612 may be located at a boundary area between the first transforming section 601 and the second transforming section 602 and may be configured in terms of their positional relationship and/or structures such that a core inserted into the first core insertion groove 611 and a core inserted into the second core insertion groove 612 may not contact each other. In one exemplary embodiment, the first core insertion groove 611 and the second core insertion groove 612 may be configured to be spaced apart from each other. In another exemplary embodiment, the first core insertion groove 611 and the second core insertion groove 612 may be configured in close contact with each other while cores inserted thereto may not contact each other by providing a double groove structure or a stepped structure within each groove.

In some exemplary embodiments, the bobbin 610 may include hollow portions formed therein. Central legs (see "623a" and "624b" of FIG. 8) of the respective cores may be inserted into the hollow portions.

The core may include one or more cores. In the exemplary embodiment of FIG. 5, four cores are shown, viz., a first core 621, a second core 622, a third core 623, and a fourth core 624.

The first core 621 is inserted into the first core insertion groove 611 of the first transforming section 601. The second core 622 is inserted into the second core insertion groove 612 of the second transforming section 602.

The third core 623 is installed to surround the first transforming section 601 of the bobbin 610. If the third core 623 is, for example, E-shaped, it may include a central leg (see "623a" of FIG. 8). The central leg of the third core 623 is inserted into a hollow portion of the bobbin 610 from one end of the bobbin. At least a portion of a terminal of the third core 623 contacts the first core 621. In some embodiments, all of three terminals of the third core 623 contact the first core 621. Accordingly, the third core 623 and the first core 621 form a first closed magnetic path.

Likewise, the fourth core 624 is installed to surround the second transforming section 602 of the bobbin 610. If the fourth core 624 includes a central leg (see "624b" of FIG. 8), the central leg of the fourth core 624 is inserted into a hollow portion of the bobbin 610 from the other end thereof. At least a portion of a terminal of the fourth core 624 contacts the second core 622. In some embodiments, all of three terminals of the fourth core 624 contact the second core 622. Accordingly, the fourth core 624 and the second core 622 form a second closed magnetic path.

Meanwhile, due to the positional relationship and/or structures of the first core is insertion groove 611 and the second core insertion groove 612, the first core 621 and the second core 622 do not contact each other but are spaced apart from each other. In this structure, the first closed magnetic path including the first core 621 and the second closed magnetic path including the second core 622 are disposed to be spaced apart from each other. Therefore, direct interference or collision between magnetic fluxes of the respective closed magnetic paths may be prevented due to this structure. As shown in FIG. 7, the magnetic flux through the first closed magnetic path and the magnetic flux through the second closed magnetic path are independent without interference from each other.

In the exemplary embodiments of the present invention, the first and second closed magnetic paths are distinct and non-overlapping, which depends on the spacing between the first core 621 and the second core 622. Therefore, to prevent interference or collision of magnetic fluxes, the first core 621 may be separated from the second core 622 in a secure, stable manner.

For example, an embossed portion 662 may be installed between the first core insertion groove 611 and the second core insertion groove 612. The embossed portion 662 may be formed on a surface of the bobbin 610. The embossed portion 662 may serve to fill the space between the first core 621 inserted into the first core insertion groove 611 and the second core 622 inserted into the second core insertion groove 612. The embossed portion 662 may have a straight shape, a straight shape with a middle portion partially excluded, and other shapes as long as it ensures spacing between the first core 621 and the second core 622.

Alternatively, an insulation member 670 may be interposed to space the first core 611 and the second core 612. The insulation member 670 may be, for example, a plate-shaped insulation plate. The insulation member 670 may be installed to be spaced apart from the first core 621 and/or the second core 622, or to partially or entirely contact the first core 621 and/or the second core 622. In some embodiments, opposing surfaces of the insulation member 670 may respectively contact the first core 621 and the second core 622.

In order to efficiently assemble the insulation member 670 in the transformer 600, an adhesive material may further be provided. In addition, structures for preventing direct contacts between the first core 611 and the second core 612 may be embodied in various manners.

The transformer of the present exemplary embodiment also includes a plurality of input/output pins 680.

Figure 8:
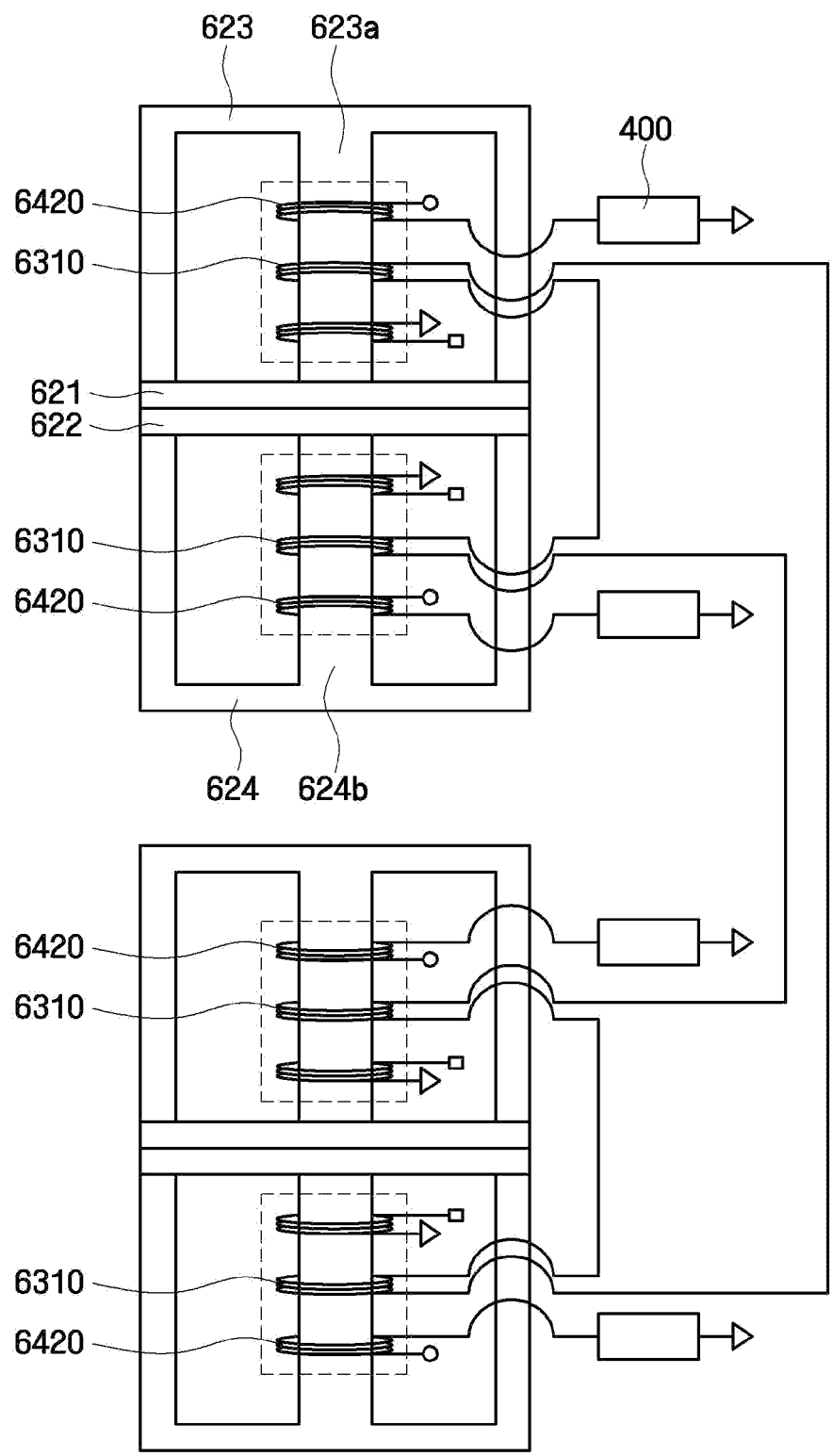
FIG. 8 is a diagram of the transformer shown in FIG. 5 and connected to several loads.

FIG. 8 is a diagram of the transformer shown in FIG. 5 and connected to several loads. In the exemplary embodiment illustrated in FIG. 8, the transformer balances current between loads connected to it.

Referring to FIG. 8, the output of a second winding 6420 is connected to a load 400. The type of the load 400 may include, for example, light sources for emitting light but is not limited thereto. Since the amount of current flowing through wiring connected to the first winding 6310 is determined by a ratio of the number of turns of the first winding 6310 to the number of turns of second winding 6420 and the amount of current flowing through a closed path is constant, the amounts of current flowing through the first windings 6310 shown in FIG. 8 are equal to each other. Thus, assuming that ratios of the number of turns of the respective transforming sections are equal to each other, the amount of current flowing through the loads 400 are also equal to each other. In this way, if a transformer is formed to maintain current balancing between loads connected to the transformer, the transformer may be referred to as a balance transformer or a balance coil. As shown in FIG. 8, since the first core 621 and the is second core 622 disposed at the boundary area between the respective transforming sections are spaced apart from each other, interference or collision between magnetic fluxes of the respective transforming sections may be suppressed, thereby inducing current balancing between the loads 400 more accurately. In an application employing light sources as the loads 400, brightness uniformity may be maintained between the light sources.

Figure 9:
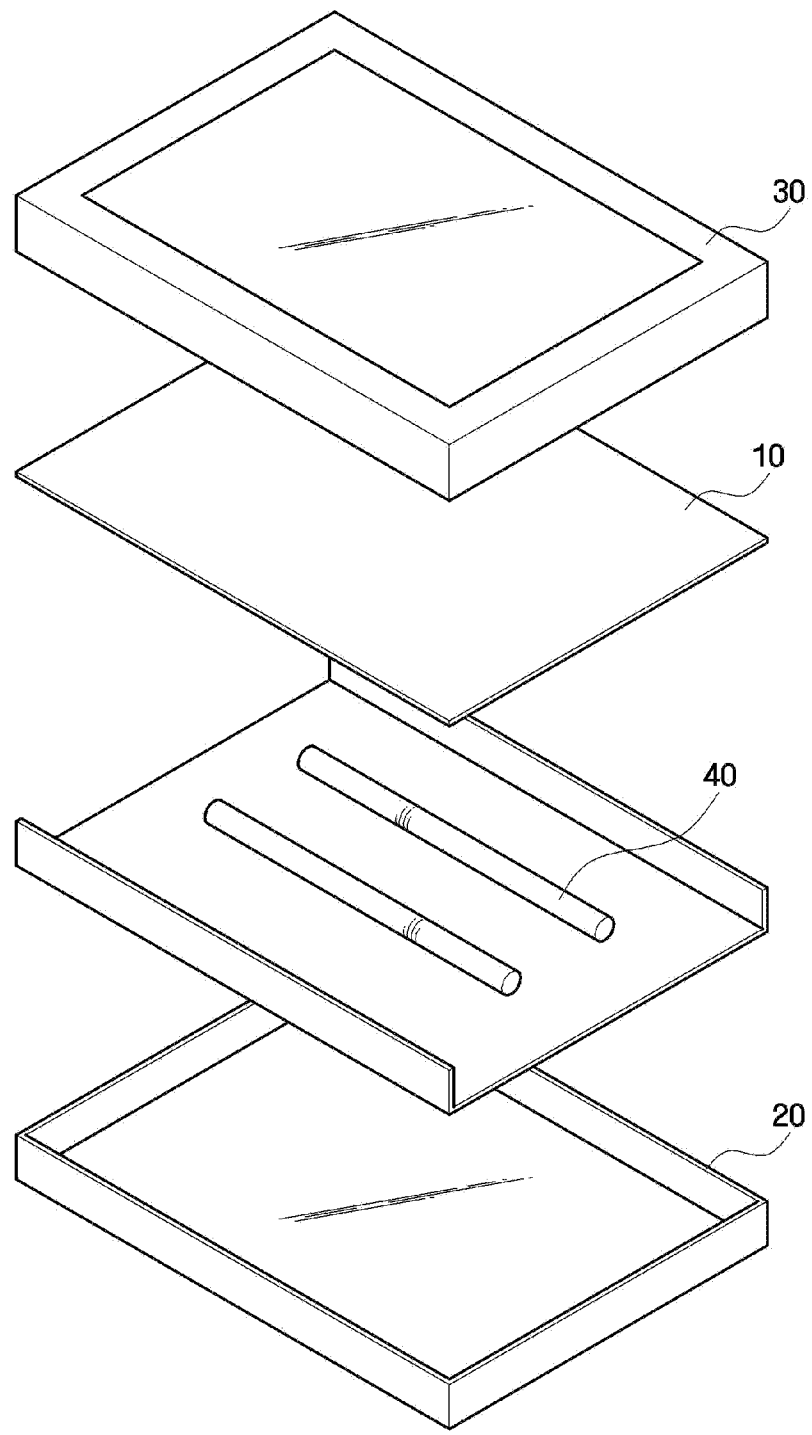
FIG. 9 is a perspective view of a liquid crystal display apparatus according to an exemplary embodiment of the present invention.
Figure 10:
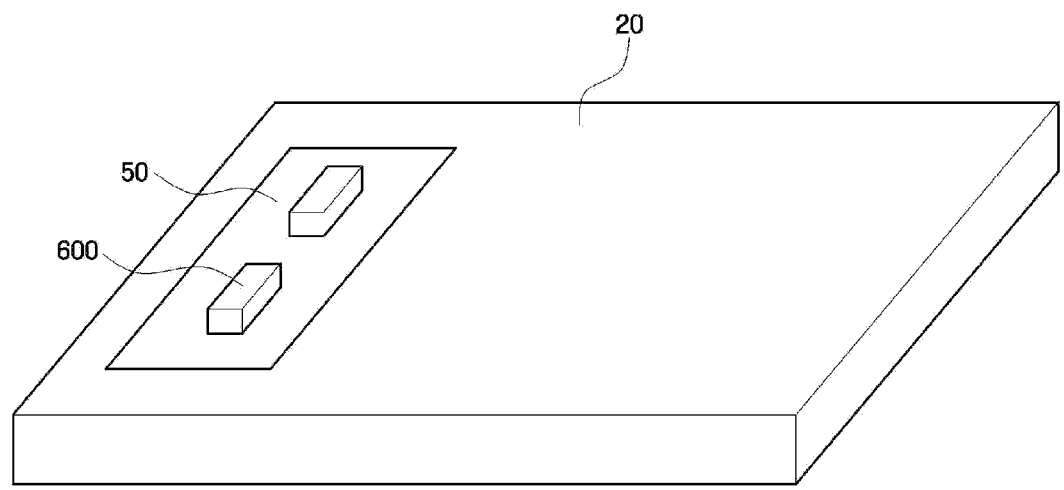
FIG. 10 is a rear view of the liquid crystal display apparatus shown in FIG. 9.

FIG. 9 is a perspective view of a liquid crystal display (LCD) apparatus according to an exemplary embodiment of the present invention, and FIG. 10 is a rear view of the LCD apparatus shown in FIG. 9.

Referring to FIG. 9 and FIG. 10, the LCD apparatus according to an exemplary embodiment of the present invention may include an LCD panel 10, one or more light sources 40 for supplying light to the LCD panel 10, a bottom chassis 20 that receives the one or more light sources 40, a top chassis 30 that covers the LCD panel 10, and a light source controller for controlling the one or more light sources 40. The light source controller may include at least one transformer 600. The transformer 600 may be formed on a printed circuit board 50.

The light source controller may be formed on the printed circuit board 50 integrally with other controllers for controlling other components of the LCD apparatus. Alternatively, the light source controller may be formed on a printed circuit board 50 separately from other controllers for controlling other components of the LCD apparatus. The printed circuit board 50 may be a printed circuit board including at least one wiring. The detailed description of the exemplary embodiments shown in FIG. 1, FIG. 2, FIG. 3, FIG. 4, FIG. 5, FIG. 6, FIG. 7, and FIG. 8 may be applied to the transformer 600 included in the LCD apparatus.

The transformer 600 may be installed to maintain current balancing between the one or more light sources 40 connected to the transformer 600 as loads. Here, the one or more is light sources 40 may be cold cathode fluorescent lamps (CCFLs), light emitting diodes (LEDs), or other light emitting sources. As described above, since current balancing between different light sources 40 may be performed more accurately by the transformer 600, brightness uniformity between the light sources 40 may be realized, which enhances the display quality of the LCD apparatus.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A transformer, comprising:
a bobbin comprising a first transforming section and a second transforming section, each of the first transforming section and the second transforming section comprising a plurality of winding sections, and at least one core insertion groove disposed between the first transforming section and the second transforming section;
at least one coil disposed around at least one of the plurality of winding sections of each of the first transforming section and the second transforming section; and
at least one core arranged in the at least one core insertion groove,
wherein the at least one core insertion groove comprises a first core insertion groove and a second core insertion groove,
wherein the at least one core comprises a first core and a second core, the first core is disposed in the first core insertion groove, and the second core is disposed in the second core insertion groove, and
wherein the first core and the second core do not contact each other.

2. The transformer of claim 1, wherein each of the first transforming section and the second transforming section comprise a primary winding section and a secondary winding section, and the primary winding section of the first transforming section and the secondary winding section of the second transforming section are disposed substantially collinearly.

3. The transformer of claim 1, wherein the bobbin further comprises at least one embossed portion disposed between the first core insertion groove and the second core insertion groove.

4. The transformer of claim 1, further comprising an insulation member disposed between the first core and the second core.

5. The transformer of claim 1, further comprising:
a third core disposed around the first transforming section of the bobbin; and
a fourth core disposed around the second transforming section of the bobbin.

6. The transformer of claim 5, wherein at least one end of the first core contacts at least one end of the third core forming a first closed magnetic path, and at least one end of the second core contacts at least one end of the fourth core forming a second closed magnetic path separated from the first closed magnetic path.

7. The transformer of claim 5, wherein the bobbin further comprises a hollow portion, each of the third core and the fourth core further comprise a central leg, the central leg of the third core is disposed in the hollow portion from one end of the bobbin, and the central leg of the fourth core is disposed in the hollow portion from the other end of the bobbin.

8. A liquid crystal display (LCD) apparatus comprising:
an LCD panel;
one or more light sources to supply light to the LCD panel; and
a light source controller to control the one or more light sources,
wherein the light source controller comprises at least one transformer, and the at least one transformer comprises:
a bobbin comprising a first transforming section, a second transforming section, and at least one core insertion groove disposed between the first transforming section and the second transforming section, each of the first transforming section and the second transforming section comprising a plurality of winding sections;
at least one coil disposed around at least one of each of the winding sections of the first transforming section and the second transforming section; and
at least one core disposed in the core insertion groove,
wherein the at least one core insertion groove comprises a first core insertion groove and a second core insertion groove,
wherein the at least one core comprises a first core and a second core, the first core is disposed in the first core insertion groove, and the second core is disposed in the second core insertion groove, and
wherein the first core and the second core do not contact each other.

9. The liquid crystal display apparatus of claim 8, wherein each of the first transforming section and the second transforming section comprise a primary winding section and a secondary winding section, and the primary winding section of the first transforming section and the secondary winding section of the second transforming section are disposed substantially collinearly.

10. The liquid crystal display apparatus of claim 8, wherein the bobbin comprises at least one embossed portion disposed between the first core insertion groove and the second core insertion groove.

11. The liquid crystal display apparatus of claim 8, further comprising an insulation member disposed between the first core and the second core.

12. The liquid crystal display apparatus of claim 8, further comprising:
 a third core disposed around the first transforming section of the bobbin; and
 a fourth core disposed around the second transforming section of the bobbin.

13. The liquid crystal display apparatus of claim 12, wherein at least one end of the first core contacts at least one end of the third core forming a first closed magnetic path, and at least one end of the second core contacts at least one end of the fourth core forming a second closed magnetic path separated from the first closed magnetic path.

14. The liquid crystal display apparatus of claim 12, wherein the bobbin further comprises a hollow portion, each of the third core and the fourth core comprise a central leg, the central leg of the third core is disposed in the hollow portion from one end of the bobbin, and the central leg of the fourth core is disposed in the hollow portion from the other end of the bobbin.

15. The liquid crystal display apparatus of claim 8, wherein the light source controller is disposed on a printed circuit board.

\* \* \* \* \*